D. E. TRUE.
Churn.
No. 18,165.  Patented Sept. 8, 1857.
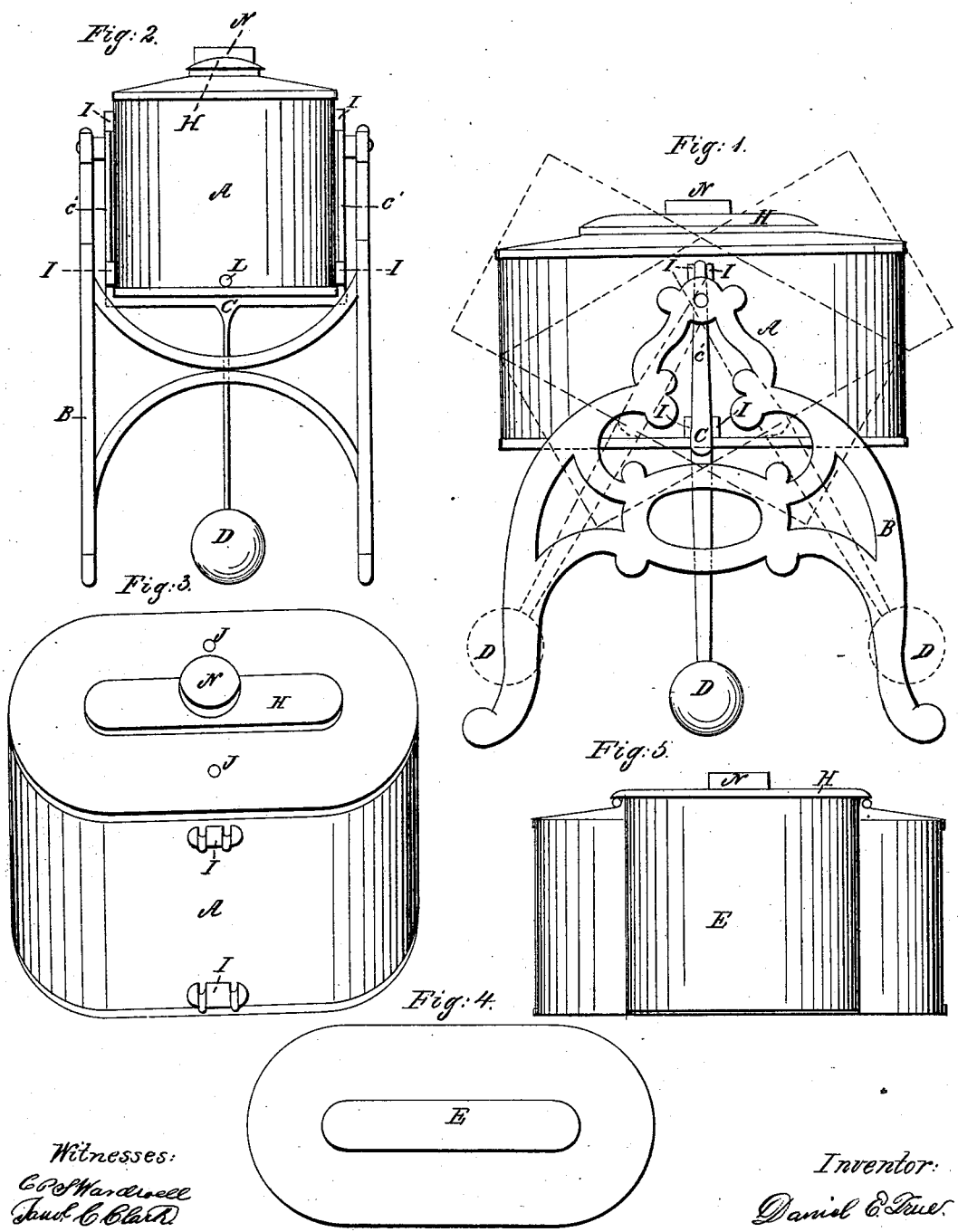
Witnesses:
C. P. Wardwell
Jud. C. Clark
Inventor:
Daniel E. True

UNITED STATES PATENT OFFICE.

DANIEL E. TRUE, OF LAKE VILLAGE, NEW HAMPSHIRE.

CHURN.

Specification of Letters Patent No. 18,165, dated September 8, 1857.

*To all whom it may concern:*

Be it known that I, DANIEL E. TRUE, of Lake Village, in the county of Belknap and State of New Hampshire, have invented a new and useful Improvement on the Rocking and other Churns Having a Similar Operation; and I do hereby declare that the following is a full, clear, and exact description of the nature, construction, and operation of the same, reference being had to the annexed drawings, making a part of this specification, in which—

Figure 1, is a side view. Fig. 2, is an end view. Fig. 3, is a perspective view of the cream cistern. Fig. 4, is a horizontal section of the cream cistern. Fig. 5, is a longitudinal section of the cream cistern, like letters referring to like parts.

The nature of my invention consists in providing the rocking or other churns, having a similar operation, with a separator, for the purpose of dividing the cream into two separate currents, and allow them to come in contact alternately.

To enable others skilled in the art to make and use my invention, I will proceed to describe its construction and operation.

I make a cream cistern 24 inches long, 15 inches wide, and 12 inches deep, (more or less,) the top and bottom being oval shaped, Fig. 3, having an aperture in the top (for the admission of cream, &c.,) with a lid, H, to fit the same. I further construct and apply to the center of the cream cistern a separator, E, which I insert by attaching it to the lid or otherwise, it being so constructed as to allow about an equal space between itself and either side and end of the cream cistern Fig. 4, and to extend to the bottom thereof, Fig. 5. I also provide the cream cistern with ventilators, J, J, an aperture, L, for discharging the whey and suitable handles for the management and operation thereof. I then construct a frame, B, 2 feet in height, (more or less,) to which I attach a swing seat, C, provided with a pendulum weight, D, for the purpose of holding and balancing the cream cistern.

To use my invention after having introduced the cream into the cistern I insert the separator E, the lid H, being attached thereto. I at the same time close the aperture in the top of the cistern. I then place the cream cistern upon the swing seat C, where it is made secure by the sides $c'$, entering the guides I, with which the cream cistern is provided therefor, the operation being accomplished by oscillating the swing seat C, which gives to the cream cistern a successive tip motion, Fig. 1, red lines, thereby causing the cream to flow rapidly, being divided by the separator, into two separate currents in its passage, which come in contact at their terminus, alternately, whereby the cream receives a violent and peculiar action which causes a speedy union of the particles of butter into one mass.

I am well aware that dashers made in the form of grates, or perforated with holes, are not new, and may be found in the specifications of Enoch Thomas and John McLaughlin's patents. Therefore I do not claim their application or use. But I apply to a circular or oval shaped cream cistern a center piece, (which I have denominated a "separator") corresponding in shape to that of the inside of the cream cistern, its perpendicular diameter being the same while its horizontal diameters are twelve inches, (more or less) smaller, thereby leaving a space of six inches, (more or less) between the separator, and the inside of the cream cistern, hence the cream flows in two separate currents nearly parallel until it arrives at the curved end of the separator, where its course is changed and the two currents come in direct collision from opposite directions, at each tip of the cream cistern, thus producing a superior agitation for separating the butter (from the whey) and causing it to unite into one mass.

Therefore what I claim as my invention and desire to secure by letters patent is—

The employment (in the rocking and other churns of similar operation) of a separator, when the same is constructed arranged and applied substantially in the manner and for the purpose herein described and set forth.

DANIEL E. TRUE.

Witnesses:
C. P. S. WARDWELL,
SAML. C. CLARK.